Figure 1:
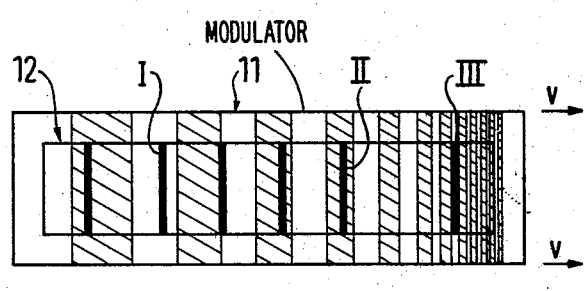

United States Patent [19]
Krause

[11] 4,448,529
[45] May 15, 1984

[54] SPECTRAL ANALYSIS OF A BEAM OF RADIATION

[75] Inventor: Gerhard Krause, Rosenheim, Fed. Rep. of Germany

[73] Assignee: Erwin-Sick GmbH - Optik-Elektronik, Waldkirch, Fed. Rep. of Germany

[21] Appl. No.: 253,357

[22] Filed: Apr. 13, 1981

[30] Foreign Application Priority Data

Apr. 16, 1980 [DE] Fed. Rep. of Germany ....... 3014646

[51] Int. Cl.³ .................................................. G01J 3/28
[52] U.S. Cl. .................................... 356/310; 250/281; 356/326; 378/82
[58] Field of Search ........................... 350/162 R, 168; 356/310, 326–334; 250/339, 226, 281; 378/82

[56] References Cited

U.S. PATENT DOCUMENTS

| | | | |
|---|---|---|---|
| 3,151,247 | 9/1964 | Auvermann | 250/339 X |
| 3,640,625 | 2/1972 | Ibbett et al. | 356/310 |
| 3,720,469 | 3/1973 | Harwit | 356/74 |

OTHER PUBLICATIONS

Marcel J. E. Golay "Multi-Slit Spectrometry", Journal of the Optical Society of America, vol. 39, No. 6, pp. 437–444; Jun. 1949.
R. N. Ibbett, et al., "Real-Time Multiplexing of Dispersed Spectra in any Wave-Length Region", Applied Optics, vol. 7, No. 6, pp. 1089–1093, Jun. 1968.
John A. Decker, et al., "Sequential Encoding with Multislit Spectrometers" Applied Optics, vol. 7, No. 11, pp. 2205–2209 Nov., 1968.

*Primary Examiner*—F. L. Evans

[57] ABSTRACT

Spectral analysis of a beam of radiation is carried out by splitting the beam of radiation into its respective spectral components and by applying a characteristic modulation to each of the spectral components before allowing them to fall on a common detector. The superimposed signals generated by the detector and representative of the spectral components are then electronically segregated by reference to the characteristic modulations that have been applied to the individual spectral components. This is conveniently done by generating a series of modulated reference signals which have been modulated in exactly the same way as the spectral components of interest. The technique is not restricted to optical spectra but can also be used, for example, for X-ray spectra and mass spectra.

45 Claims, 16 Drawing Figures

SPECTRAL ANALYSIS OF A BEAM OF RADIATION

The present invention relates to a method and apparatus for the spectral analysis of a beam of radiation to determine one or more spectral components thereof and has particular, but not exclusive, reference to the spectral analysis of optical radiation.

In known apparatus for spectral analysis some form of splitting means such as a dispersive member or a separator is used to split a beam of radiation into a spatially dispersed spectrum. The individual spectral components of the spectrum can then be determined and evaluated from their different positions within the spectrum.

By way of example, an optical spectrometer can be used to selectively disperse incoming radiation into various spectral components of different wavelengths by means of a prism or grating; the various wavelengths are directed to different locations in the exit plane of the spectrometer. The spectral components are then scanned one after the other with a slot aperture or an equivalent arrangement. This known method has the disadvantage that only a very small part of the spectrum can be evaluated at any one time. At low intensities the time required to detect part of the spectrum then becomes very large in order to obtain a good signal to noise ratio.

Arrangements are also known in which several detectors, each positioned behind a respective slot aperture, are arranged at locations in the spectral plane of a spectrometer at which the spectral components under investigation are expected. This arrangement makes good use of the energy of the spectral components under investigation. Its application is however restricted in practice to a small number of preselected spectral components. It is difficult to change the selection of spectral components and almost impossible to separate spectral components which lie very close to one another because the constructional elements of the slot apertures and also the detectors interfere with the neighbouring spectral components.

Fourier spectrometers are also known which make good use of the energy of the spectrum under investigation. Fourier spectrometers however require a high degree of mechanical precision in the interferometer that is used. This in turn leads to the Fourier spectrometer being generally unsuitable for use as a factory measuring apparatus. Fourier spectrometers have in any case not been extensively used (at the present time) for wavelengths below 1 $\mu$m because of the high degree of accuracy that is required. A further disadvantage of Fourier spectrometers lies in the fact that the energy of the total spectral range, which also includes the unused spectral sections, all falls on the photodetector. This increases the amount of noise that is generated and reduces the signal to noise level.

The principal object underlying the present invention is to provide a method and an apparatus for analysing spectra which make good use of the energy of the spectrum in question and in which the physical spectrum is converted into an electronic spectrum.

In this way the apparatus can be rapidly adapted to select other spectral components of interest and the complexity and cost of the apparatus can be kept relatively low because modern electronic components are available at a very advantageous price.

It is a further object of the invention to provide a method and an apparatus in which the sections of the spectrum that are not of interest can be blended out with sharp boundaries.

It is a yet further object of the present invention to provide apparatus for spectral analysis in which the requirements on mechanical precision are small when compared with the requirements of a Fourier spectrometer.

It is also intended to provide a method and an apparatus which makes is possible not only to analyse the full optical spectrum without difficulty, including the infrared and ultraviolet ranges, but which in addition makes it possible to process spectra which cannot be dealt with using Fourier spectroscopy. Such spectra include in particular nuclear spectra, X-ray spectra and mass spectra.

In order to accomplish the above objects there is provided, in accordance with the invention, a method of spectral analysis of a beam of radiation to determine one or more spectral components thereof, the method comprising the steps of (a) directing the beam of radiation to splitting means capable of splitting the radiation into a spectrum of different spectral components so that distinct locations along the spectrum are associated with respective spectral components in said beam or, conversely, so that different spectral components originating from distinct locations in the beam are directed through a common location by said splitting means, (b) modulating said radiation either before or after said splitting means by modulator means which imposes a location dependent modulation on the spectral components, (c) collecting the modulated spectral components on common detection means to generate superimposed signals representative of these spectral components, (d) electronically segregating the signals in dependence on the modulations applied to the spectral components to form an individual measurement signal for the or each spectral component of interest.

Also according to the present invention there is provided apparatus for the spectral analysis of a beam of radiation to determine one or more spectral components thereof, said apparatus comprising splitting means capable of splitting said beam of radiation into a spectrum of different spectral components so that distinct locations along the spectrum are associated with respective spectral components in said beam or, conversely, so that different spectral components originating from distinct locations in said beam are directed through a common location by said splitting means; means for modulating said radiation either before or after said splitting means to impose distinct location dependent modulations on each of the spectral components to produce individually modulated spectral components; common detector means for receiving the individually modulated spectral components to generate superimposed signals representative of these modulated spectral components and electronic processing circuitry for electronically segregating said superimposed signals in dependence on the modulations applied to the spectral components to form an individual measurement signal for the or each spectral component of interest.

The method and apparatus of the present invention thus make it possible to segregate the spectral components of interest by imposing a location dependent modulation on each of the spectral components in such a way that at any one time the individual spectral components are differently modulated, by generating signals (in particular electrical signals) from a detector common to all the spectral components and by subsequently electronically processing these signals to break them down into individual signals characteristic of the spectral components that are of interest.

The location dependent modulation of the individual spectral components can either be effected at distinct locations along the spectrum or in the beam of radiation before it falls on the splitting means.

The electronic segregation of the measurement signals for the individual spectral components is conveniently carried out using reference signals to demodulate the superimposed signals received from the detector.

Thus, in a preferred embodiment, the method comprises the further step of forming, in respect of each spectral component of interest, a reference signal having a frequency related to the modulation frequency applied to that spectral component and the step of electronically segregating the signals comprises the step of using this reference signal to filter out the measurement signal associated with that spectral component from the superimposed signals.

In an alternative arrangement the superimposed modulated signals representative of the spectral components are fed to a dispersive delay line the length of which is chosen, in dependence on the change of the modulation frequency with time, so that all the signals representative of a single spectral component arrive simultaneously as a packet at the end of or at a tapping point of the dispersive delay line and the times of arrival of the individual packets are determined to identify the spectral components.

The basic thought underlying the invention can thus be seen in the concept that one should modulate each individual point of the spectrum with an individual frequency at any particular time so that each point of the spectrum is provided with an individual code which enables it to be electronically segregated from other points of the spectrum and individually investigated. The individual spectral components can in fact each be modulated with the same modulation function but at different times. In this way preferred embodiments are possible in which a physical modulator is moved continuously and at a constant speed over the length of the spectrum.

By forming modulated reference signals it is at all times possible to identify that point of the spectrum which has been modulated with the same modulation. In other words it is at all times possible to find which modulation frequency is associated at any particular time with a particular point in the spectrum. A knowledge of this association makes it possible to filter out the signals corresponding to the individual spectral components from the mix of frequencies present at the output of the single detector.

The invention can be summarized by the statement that each point of all or part of the spectrum is marked at any particular time by an individual modulator line spacing and that this line spacing preferably moves periodically and continuously across the spectrum. The point of the spectrum that is of interest is then investigated, by checking for the presence or absence of a corresponding signal using the modulator line spacing that is present at any one time.

The relationship between the period of the modulator and the line widths of the spectral components is important for accurate spectral analysis. The widths of the transmitting elements of the modulator should preferably lie in the order of magnitude of the line widths.

The smallest period of the modulator relative to the line widths of the spectral components should be approximately 2:1. The ratio of the largest period of the modulator to the line widths of the spectral components should in contrast lie between 2.1:1 and 4:1.

Further advantageous embodiments of the method and apparatus are set forth in the subclaims.

Figure 2:
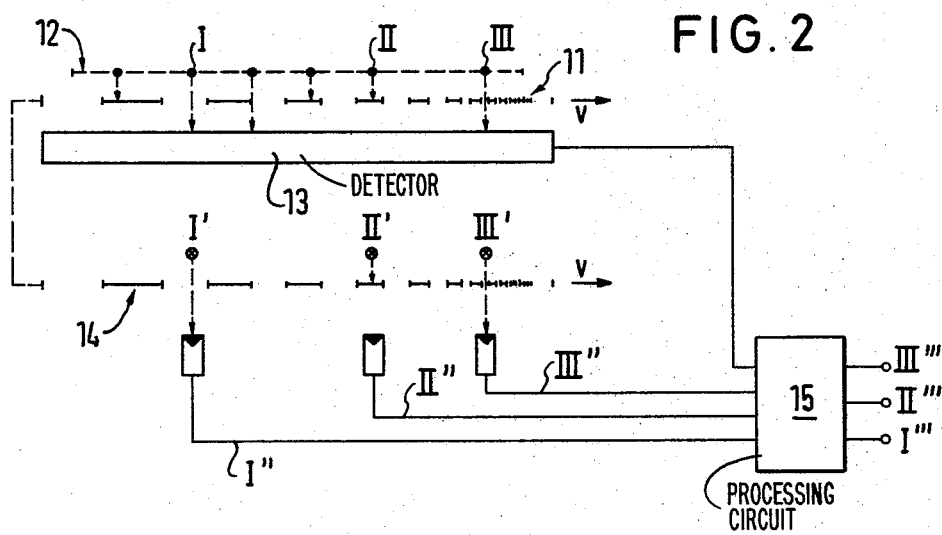
Figure 3:
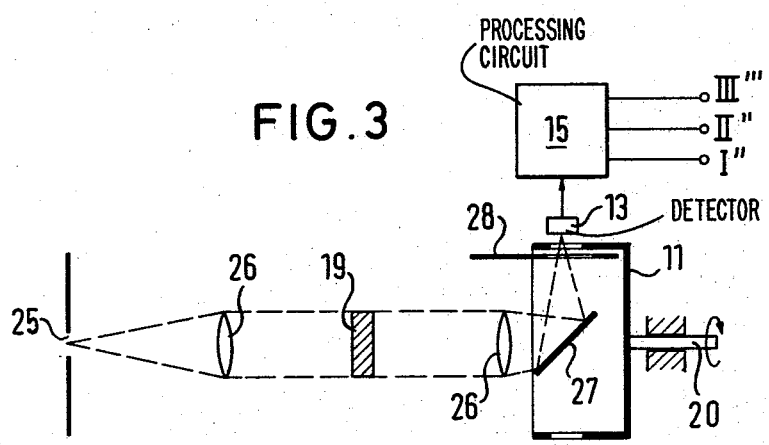
Figure 4:
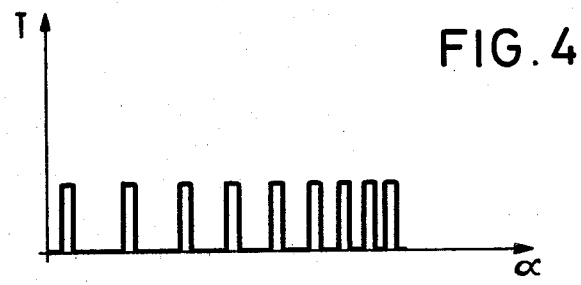
Figure 5:
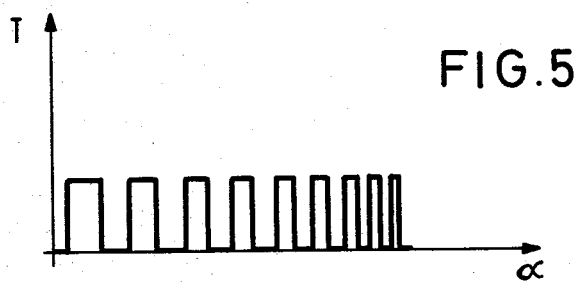
Figure 6:
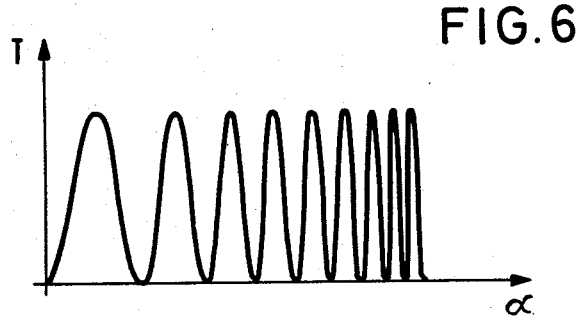
Figure 7:
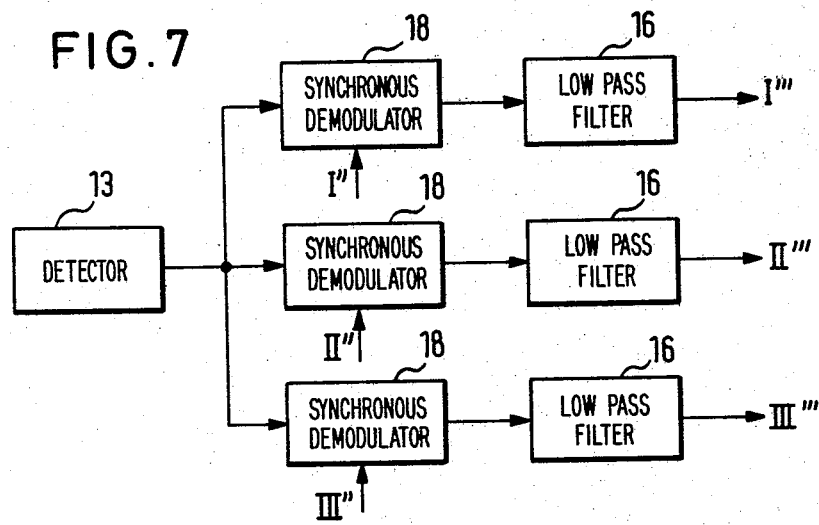
Figure 8:
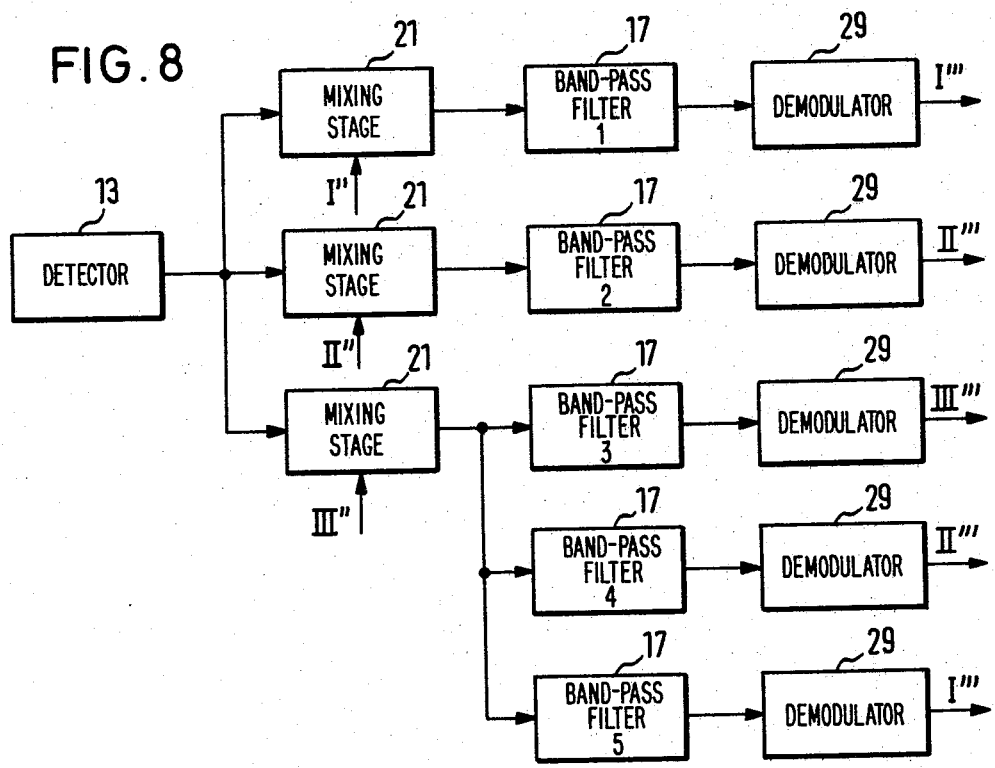
Figure 9:
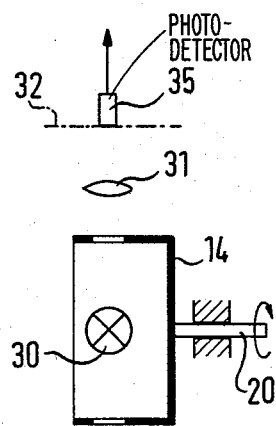
Figure 10:
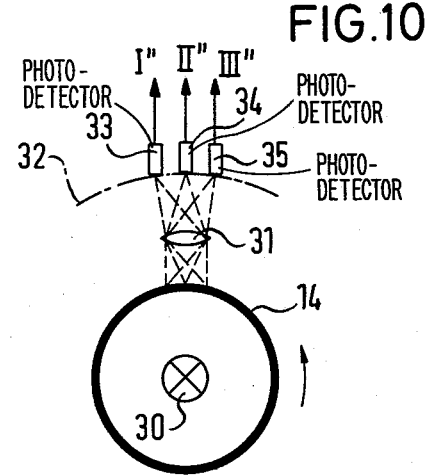
Figure 11:
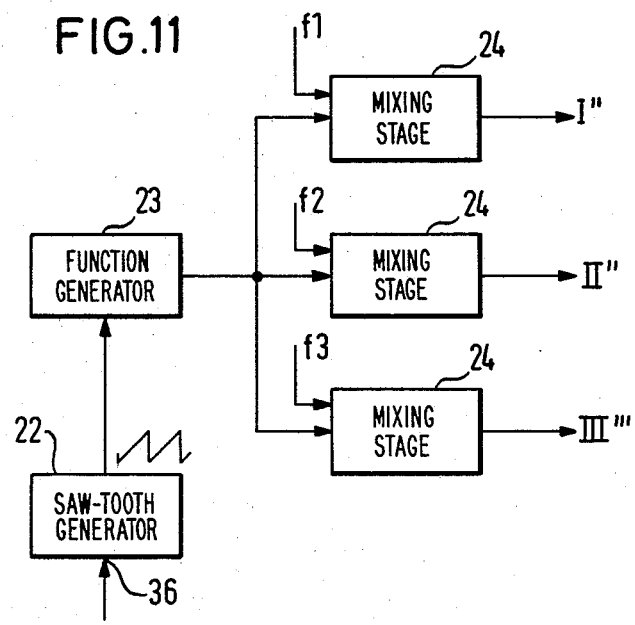
Figure 12:
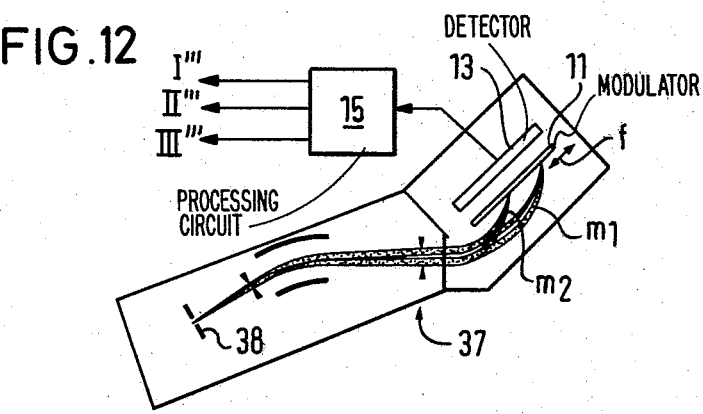
Figure 13:
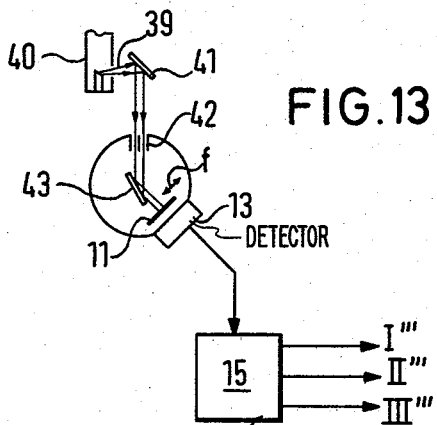
Figure 14:
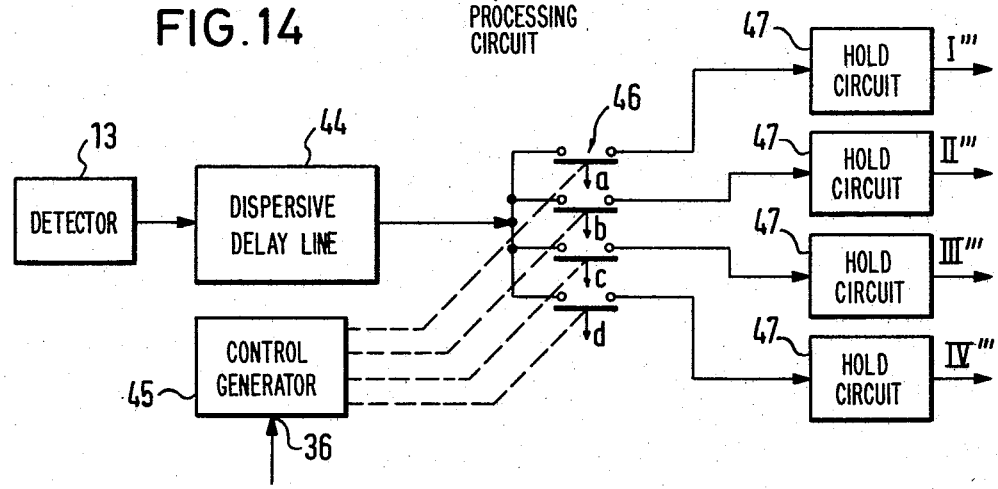
Figure 15:
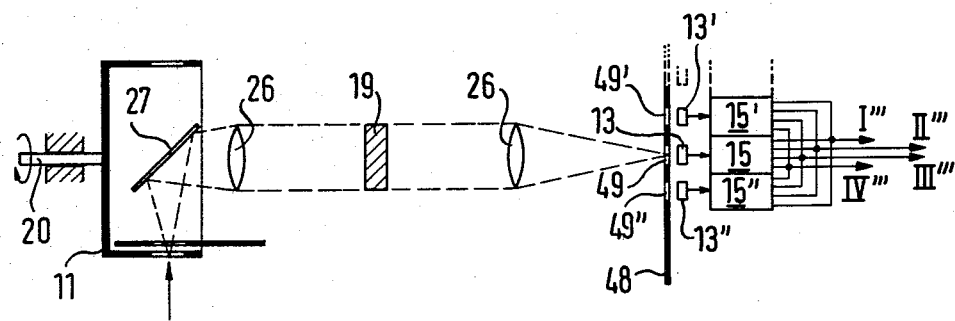
Figure 16:
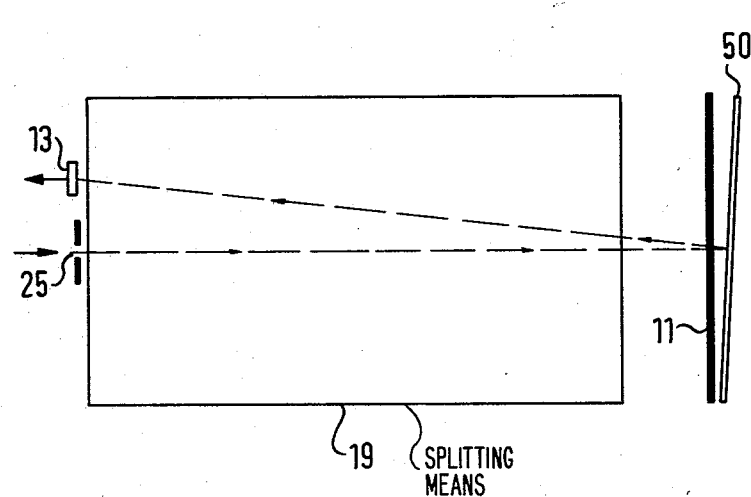

Embodiments of the invention will now be described in further detail and by way of example only with reference to the accompanying drawings which show:

FIG. 1 a schematic plan view of a spectrum with a modulator arranged in front of the spectrum, FIG. 2 a plan view of the subject matter of FIG. 1 as seen from above and also schematically illustrating further elements of an apparatus for analysing the spectrum, FIG. 3 a schematic view of an apparatus for analysing a spectrum showing the use of a chopper drum as a modulator, FIG. 4 a diagram of the transparency T of the chopper drum of FIG. 3 as a function of the angle of rotation $\alpha$ of the chopper drum, FIG. 5 a diagram similar to FIG. 4 showing a particularly preferred relationship between the transparency T and the angle of rotation $\alpha$ of the chopper drum, FIG. 6 a further diagram similar to the diagrams of FIGS. 4 and 5 but wherein the transparency or transmission of the chopper drum T changes sinusoidally with the angle of rotation $\alpha$ thereof, FIG. 7 a block circuit diagram of a first advantageous embodiment of an electronic processing circuit suitable for use in apparatus in accordance with the present invention, FIG. 8 a block circuit diagram of a second preferred embodiment of an electronic processing circuit, FIG. 9 a view of a chopper drum arrangement for forming a reference signal, FIG. 10 a plan view of the subject of FIG. 9, FIG. 11 a block circuit diagram of a circuit arrangement for forming reference signals, FIG. 12 a schematic illustration of a mass spectrometer in which the spectra are analysed in accordance with the method of the present invention, FIG. 13 a schematic view of an X-ray spectrometer in which the spectra are analysed in accordance with the method of the present invention, FIG. 14 a further advantageous embodiment of a processing circuit this time incorporating a dispersive delay line, FIG. 15 a schematic block illustration of an alternative embodiment of the present teaching and FIG. 16 a schematic illustration of a further embodiment of the present teaching.

Referring firstly to FIGS. 1 and 2 there can be seen a modulator 11 constructed as a chopper strip or bar which is moved at a speed v in the direction of the arrows past a line spectrum 12 which can, for example, be an optical spectrum and can be generated in any desired manner. The modulator 11 consists of a series of modulating elements and in this case a series of alternately transmitting and non-transmitting regions. The non-transmitting regions are, however, only shown in hatched lines in FIG. 1 for the purposes of illustration so as not to hide the lines I, II and III which represent the spectrum components of the line spectrum which are of interest and which are present just behind the modulator in the illustration of FIG. 1. Between the hatched regions the light from the spectral lines can pass unhindered through the modulator 11. As can be clearly seen from FIGS. 1 and 2 the modulation frequency of the modulator 11 increases from left to right because the periodicity of the modulator structure continuously decreases. It should be mentioned that the widths of the grating bars of the modulator 11 are greatly exaggerated in the illustration of FIGS. 1 and 2 in order to make it easier to illustrate the arrangement of the modulator 11 which is important for the invention. In practice even the widest modulator elements of the modulator are so narrow that their width relative to the widths of the sprectal lines that are to be evaluated lies approximately in the range 2:1 to 4:1.

As seen in FIG. 2 the modulator 11 is arranged between the spectrum 12 and a common detector 13 which extends over the whole length of the spectrum 12. The detector 13 could also be substantially shorter and all the light passing through the modulator 11 could be concentrated onto the single detector by optical means. When using an optical spectrum the common detector 13 takes the form of a photoelectric converter. The spectrum 12 and the modulator 11 are arranged as close as possible to one another and preferably lie in the same plane.

If the modulator 11, which can for example form the periphery of a modulator drum, is moved with a speed v past the spectrum 12 each point of the spectrum 12 will be modulated at any one time with a different frequency. As the light of the individual spectral components, in particular the spectral components I, II and III fall through the gaps of the modulator grid 11 onto a common detector 13 an electrical signal appears at the output of the detector which is composed of the superimposed modulation frequencies of all the modulated spectral components.

In practice of course the modulator 11 continuously moves across the line spectrum. It can be imagined in FIGS. 1 and 2 that similar modulators are arranged at both ends of the modulator 11, either directly or with an interval therebetween. In other words identical modulators 11 continuously move one after the other past the spectrum 12. This can be realized, as previously mentioned, by arranging the modulator 11 on the cylindrical periphery of a modulator drum so that the same modulator repeatedly passes the spectrum 12.

The apparatus of FIG. 2 also includes a processing circuit which is used to select the signals representative of the individual spectral components from the superimposed signals which appear at the output of the detector 13, i.e. from the resulting frequency mix. For this purpose reference signals I", II", III" from three light barriers, I', II', III' are passed to the processing circuit in addition to the output signal from the detector 13. A further modulator 14, which in the present embodiment is constructed in the same way as the modulator 11, is associated with the light barriers. The identically constructed modulators 11, 14 move in exactly the same way, i.e. with the same speed and the same phase, as is illustrated in FIG. 2 by a broken line. This can for example be realized by arranged two identically constructed chopper drums on a common rotational axle.

The light barrier I' is located at a position of the modulator 14 which corresponds to the location of the spectral component I of the spectrum 12. In the same way the further light barriers II' and III' are positioned to correspond with the spectral components or lines II and III respectively.

By way of example the light barrier I' delivers a reference signal of constant amplitude to the processing circuit 15 with the frequency of the reference signal being the same as the frequency with which the spectral component I is modulated. The same holds for the reference signals which are generated from the light barriers II' and III' and which differ from one another at any one time. The reference frequency signals I", II" and III" can be used in the processing circuit 15 to filter out frequency signals corresponding to the individual spectral components I, II and III from the frequency mix coming from the detector. These frequency signals can then be reproduced at the outlets I''', II''' and III''' respectively. It is naturally not necessary for spectral lines to be present at the positions I, II and III of the spectrum 12. The apparatus of the invention itself determines by way of the described arrangement whether a spectral line is present at the positions I, II or III or not.

FIG. 3 shows further detail of a practical embodiment.

In FIG. 3 a slot 25 which is irradiated by the beam of radiation to be analysed is imaged via lenses 26, splitting means 19 (which can be constructed as a grating or a prism) arranged between the lenses 26 and a deflecting mirror 17 arranged in the interior of a chopper drum 11 on the cylindrical surface of the chopper drum 11 which carries the modulation structure of FIGS. 1 and 2.

Possible modulator structures for the chopper drum 11 are shown in FIGS. 4 to 6. As can be seen the spatial frequency of the light transmitted through the grating is not constant but changes continuously. When the chopper drum rotates about its axis 20 with constant speed a point of light which falls on the cylindrical peripheral wall of the chopper drum 11 will be modulated with a temporally changing frequency. After each rotation of the chopper drum the frequency springs back to its original value. FIGS. 4 to 6 show the change in transmission of the chopper drum 11 for only a few of the modulator elements in order to make the illustration easier to understand. In practice the peripheral wall of the chopper drum 11 has a very large number of spaces or transmitting regions, for example between $10^3$ and $10^5$, in order to achieve a good resolution of the spectrum.

As seen in FIG. 3 the common detector is once again connected to the processing circuit 15 which has the outputs I''', II''' and III'''. The invention can however basically be enlarged to cope with any desired number of spectral components. The arrangement with three spectral components as shown in the embodiments has been selected merely by way of example to make the explanation clearer.

For the sake of simplicity it should now be assumed that the spectrum consists of discrete spectral components (spectral lines) of which the components I, II and III are to be determined. These discrete spectral components are sharply imaged alongside one another at specified intervals in the peripheral direction around the peripheral wall of the chopper drum 11. Behind the wall of the chopper drum 11 the radiation of all the spectral components falls on a common detector 13. All the spectral components of the spectrum are modulated with the same continuously changing frequencies as a result of the rotation of the chopper drum 11 at constant speed. The instantaneous modulation frequencies of all the three spectral components I, II and III are however different from each other because the spectral components fall on different parts of the peripheral wall of the chopper drum.

This circumstance is exploited in the processing circuit 15 to separate the signals of the individual spectral components from the superimposed signals at the output of the detector 13 so that three outputs I''', II''' and III''' are created by the processing circuit which are representative of the strength of the associated spectral components.

A first preferred embodiment of the processing circuit 15 of the invention is illustrated in the form of a circuit block diagram in FIG. 7.

The electrical output signal originating from the detector 13 which comprises a frequency mix of all the spectral components is applied in parallel to three synchronous demodulators 18. Although in the present embodiment three parallel synchronous demodulators 18 are once again used to evaluate three spectral components, the number of synchronous demodulators 18 could be increased or decreased depending on the number of points of the spectrum 12 that are to be evaluated.

The evaluation of three points of the spectrum lends itself for example to exhaust gas measuring apparatus for flues where, for example, the prortion of $CO_2$, $SO_2$ and smoke are to be detected.

The synchronous demodulators 18 also receive as further inputs respective ones of the reference signals I'', II'', and III'' originating from the light barriers I', II'' and III'' of FIG. 2. In this manner each synchronous demodulator 18 receives a reference signal which always has the instantaneous frequency with which the spectral component associated with the respective channel has instantaneously been modulated.

As a result of the special choice of the two input signals the frequency of the signal of the respectively associated spectral component at the output of each synchronous demodulator 18 is equal to zero. In contrast the frequencies of the signals of the other spectral components are not equal to zero.

The undesired signals of the other spectral components can thus be suppressed by low pass filters 16 which are individually connected to the synchronous demodulators 18. Accordingly, only the signals of the individual spectral components I, II and III which are to be selected are present at each of the outputs I''', II''', III''' which form the outputs of the entire processing circuit 15.

By suitable arrangement of the light barriers I', II' and III' as shown in FIG. 2 the reference signals can be formed at any desired locations of the spectrum 12 which is to be analysed. The desired spectral components of the optical spectrum can thus be selected by electronic means. As a result of this circumstance the apparatus of the invention can be manufactured extremely economically and can be readily adapted to measure different spectral components.

A further very important advantage of the apparatus of the invention resides in the fact that the energy of the optical spectrum is ideally utilized. In contrast to the conventional methods in which the spectral components are scanned one after the other, in the method of the present invention all the spectral components fall at the same time on the detector 13. There is thus no need for any form of optical or mechanical device to ensure that the individual spectral components fall one after the other on the detector and this represents a significant saving because such devices are necessarily complex and costly.

The present invention results in the selection process being transferred completely into the electronic region where the selection can be carried out very economically and accurately using modern electronic devices.

The only significant energy loss which occurs results from the non-transparent sections of the modulating chopper drum 11. The loss resulting from the modulator 11 can be minimized when the mark space ratio of the modulator is made approximately 0.5. This preferred embodiment of the modulator corresponds to the mark space ratio illustrated in FIG. 5.

As shown in FIG. 3 a spectral range stop 28 can also be arranged before or after the transmission window of the modulator 11 in order to cut down the spectrum formed by the spectrometer to a desired range. The spectral range stop 28 thus only permits selected regions of the whole spectrum to reach the modulation structure of the modulator 11 and thus the detector 13. The optical axis of the lenses 26 and the deflection mirror 27 is located, as seen in FIG. 3, on the rotational axis 20 so that uniformly sharp images of the spectral lines are formed on all points of the cylindrical peripheral wall of the chopper drum 11.

Whereas the modulator functions of the modulators of FIGS. 4 and 5 are rectangular it is also possible to use a sinusoidal modulation function for the modulator 11 in which the transmission of the elementary periods is a sinusoidal function of position or time as shown in FIG. 6. The sinusoidal modulation function has the advantage that cross sensitivities due to harmonics of the modulation function are avoided. Although, for this reason, selection using sinusoidal functions is preferred it is now readily possible to analyse functions for desired functional components in particular by using computers. It is thus possible to use triangular shaped elementary periods without the evaluation being disturbed by the harmonics of neighbouring channels.

In accordance with the invention the use of a continuously variable frequency as a function of location and time is particularly advantageous. It is particularly favourable if the modulation frequency increases linearly with location and time because the maximum resolution of the spectrum is achieved for a given mechanical position of the chopper drum 11.

Non-linear frequency changes as a function of location and time can for example also be advantageously used when different resolutions are required for different sections of the spectrum. In principle any desired discontinous modulation function can be used it is only important that in each case the reference signals are proportional or at least similar at any point in time to the modulation applied to the respectively associated spectral components.

Unused spectral sections increase the mean output signal of the detector 13. If, by way of example, a photodiode is used as the detector 13 the rise in the DC current can be unnecessarily large in a case of this kind. This means that the noise of the detector 13 at all frequencies is enlarged. In order to prevent this it is advantageous to stop out unwanted spectral regions before the detector 13. It is particularly advantageous if this is done using a mechanical aperture stop in the plane in which optical spectrum is sharply imaged so that very sharp band edges can be achieved with a minimum of effort, so that desired ranges can be blocked out as required and so that a changeover between blocked out ranges can be rapidly effected. The mechanical range stop 28 shown in FIG. 3 is preferably used for this purpose.

A further embodiment of a processing circuit in accordance with the present invention is shown in FIG. 8. This circuit makes an even more efficient evaluation of the signal of the detector 13 possible.

As seen in FIG. 8 the output signal of the detector 13 is applied in parallel to three mixing stages 21 with reference signals I″, II″ and III″ being supplied to respective second inputs of these mixing stages. In contrast to the embodiment of FIGS. 2 and 7 the reference signals for the circuit arrangement of FIG. 8 are selected so that the output frequency of each mixer 21 is constant but not equal to zero.

This can for example be achieved when the modulators 11, 14 of FIG. 2 do not operate exactly in phase but have instead a predetermined phase difference which then leads to the desired, temporally constant difference frequencies.

If, by way of example, the difference frequency is used and if the modulation frequency increases linearly with location and time then the frequency of the reference signals I″, II″ and III″ must also rise linearly with the frequency of the modulation and indeed the following relationship must hold:

$$f_M(t) = f_a + f_{\ddot{u}}(t); \text{ and } f_M(t) = -f_a + f_{\ddot{u}}(t) \quad (1)$$

with $f_a$ = constant.

By differentiation with respect to time one obtains:

$$df_M/dt = df_{\ddot{u}}/dt \quad (2)$$

The symbols used in the above formulae signify:
$f_M$: time-dependent modulation frequency of the spectral components
$f_{\ddot{u}}$: time-dependent modulation frequency of the reference signals
$f_a$: preferably constant output frequency of the mixer
t: time.

If the sum frequency at the output of the mixer 21 is used then the following relationship must hold:

$$f_M(t) = f_a - f_{\ddot{u}}(t); \quad (3)$$

where $f_a$ is once again constant.
Differentiation produces:

$$df_M/dt = df_{\ddot{u}}/dt \quad (4)$$

The output signal of the mixer 21 is now passed through a band-pass filter 17 the center frequency of which is the same as the frequency $f_a$. Depending on how the reference signals I″, II″, III″ are derived it is under certain circumstances more favourable to choose the pass frequency $f_a$ of the band-pass filters 17 of the individual channels to be either the same or different from each other. The narrower the band width of the band-pass filter 17 the better is the resolution of the arrangement with regard to the physical input spectrum.

In the above discussion it has been assumed, for the sake of simplicity, that the spectral components take the form of discrete spectral lines I, II and III. The apparatus of the invention however also operates for continuous physical spectra. The bandwidths of the filters 16 of FIG. 7 and 17 of FIG. 8 then determine the width of the physical spectrum which is selected by any one channel.

The lower part of FIG. 8 also illustrates how a single mixing stage 21 can be used for all three channels. In this arrangement three different difference frequencies, which are however each temporally constant, are present at the output of the mixing stage 21 and can be selected by three band-pass filters 17.

The final output signals I‴, II‴ and III‴ respectively are then obtained at the outputs of demodulators 29 which follow the band-pass filters 17.

The output signals I‴, II‴ and III‴, which represent the individual spectral components, can be converted in known manner into values representative of the concentrations of material components. If necessary a suitable system of equations must be used to remove cross sensitivities.

Very high modulation frequencies of up to 10 MHz can be realized with mechanical modulators because the chopper drum 11 moves parallel to the extent of the optical spectrum. Such high modulation frequencies lead to extremely high resolution which can only be limited by the optical resolution of the splitting means (monochromator, spectrometer, grating or prism). Thus, spectral lines which lie very close to one another can also be readily separated using the apparatus or method of the present invention.

Apart from chopper drums one can also use longitudinally moved chopper strips. It is also possible to use round rotating chopper disks provided that their curvature is negligible as a result of the use of a large radius. Moreover, all other methods of modulating a spectrum can be used provided the transparency of many spatially separated closely adjacent location can be rapidly changed for the physical quantity that is involved (light, X-rays etc.). Optoacoustic travelling wave modulators, in which an acoustic wave propagates parallel to the optical spectrum and modulates the optical transparency in dependence on the local amplitude are also particularly suited for use as modulators. The frequency of the acoustic wave that is fed into the modulator must vary with time in accordance with the desired modulation function.

FIGS. 9 and 10 show a practical realization of an arrangement for forming the modulated reference signals I″, II″ and III″. In this arrangement a chopper drum 14 which is constructed in just the same way as the chopper drum 11 of FIG. 3 is rotatably and fixedly mounted on the rotational axle for the chopper drum 11. The window defined by the desired modulation structure in the cylindrical peripheral wall of the second chopper drum 11 is illuminated by a light source 30 arranged within the drum 14. A lens 31 arranged radially outside the peripheral wall of the chopper drum 14 is used to image the modulation structure provided in the peripheral wall of the chopper drum 14 onto an (imaginary) peripheral surface 32 which extends concentrically around the chopper drum 14. Three photodetectors 33, 34 and 35 are arranged alongside one another in the view of FIG. 10 on this peripheral surface 32. The light source 30 forms, together with the photodetectors 33, 34 and 35 the light barriers I′, II′ and III′ respectively which are schematically illustrated in FIG. 2. The location of the photocells 33, 34 and 35 on the peripheral surface 32 determine the locations of the points of the spectrum 12 that are to be evaluated.

The output signals of the photocells 33, 34, 35 form the modulated reference signals I'', II'' and III'' which are fed either to the synchronous demodulators 18 of FIG. 7 or to the mixing stages 21 of FIG. 8.

It is important, in accordance with the illustration of FIG. 2, that the modulation produced by the modulation structures on the cylindrical peripheral walls of the chopper drums 11 and 14 of FIGS. 3, 9 and 10 are identical. Both chopper drums 11, 14 are usefully arranged at the same axle 20 although the insertion of gears is also basically possible. Both chopper drums 11, 14 must however be driven in synchrony with one another.

In order to obtain optimum resolution additional slots should be arranged in front of the photodetectors 33, 34 and 35 so that the slots appropriately restrict the imaged portions of the modulation structure.

In arrangements which use the reference modulator 14 of FIGS. 9 and 10 the frequency difference between the output signals of the photodetectors 33, 34 and 35 and the associated measurement signals from the detector 13 is zero provided no phase difference exists between the two modulators 11, 14. The two sets of signals are then suitable for processing in the circuit of FIG. 7.

If a peripheral phase difference exists between the two modulators 11, 14 then the corresponding difference signals are constant and not equal to zero if the modulation function is a linear function of the angle of rotation of the modulators. The signals are then suited to processing in the circuit of FIG. 8.

The methods described with reference to FIGS. 3, 9 and 10 for forming the modulated reference signals can also be obtained using other modulators and in particular with other mechanical choppers and acousto-optical modulators.

FIG. 11 shows a circuit in which the modulated reference signals I'', II'' and III'' are obtained entirely by electronic means. In this arrangement a saw-tooth generator 22 is synchronized, by a synchronizing input signal supplied to it at 36, with the spectral component modulator. The saw-tooth generator 22 is connected to a function generator 23 and the saw-tooth signal from the saw-tooth generator controls the frequency of the function generator so that it changes linearly with time in accordance with the saw-tooth signal. The output signal of the function generator 23 is applied in parallel to three mixing stages 24. Different temporally constant frequencies $f_1$, $f_2$ and $f_3$ are then fed to other inputs of the three mixing stages respectively. These constant frequencies are either added to or subtracted from the frequency of the function generator 23. Thus three reference signals I'', II'' and III'' are present at respective outputs of the mixing stages 24. The choice of the fixed frequencies $f_1$, $f_2$ and $f_3$ specifies the respective points of the spectrum 12 falling on the detector 13 which are passed on for evaluation.

Whereas in the preceding embodiments only the processing of optical spectra has been described, the method of the invention can also be used for processing all other physical spectra provided the physical quantity under consideration can be influenced by splitting means, such as dispersive elements or separators, so that the spectral components are spatially separated from one another and providing a spatially extended modulator 11 of the above described kind is available.

FIG. 12 is a schematic illustration of a mass spectrometer 37 with a particle source 38. The individual spectral components are spatially separated from one another in known manner by suitably arranged electric and magnetic fields. By way of example FIG. 12 shows two fluxes of separated particles with the masses $m_1$ and $m_2$.

The modulator 11, which has numerous fine slots the spacing between which continuously changes, is periodically moved to and fro in a longitudinal direction and is arranged in the focussing plane for the individual particle fluxes. The oscillatory movement of the oscillator 11 is indicated by the double arrow f. A particle detector or current collector electrode 13 is arranged behind the modulator 11 and picks up all the atoms and molecules which pass through the modulator 11 without selection. The subsequent processing of the signal from the common detector 13 in a processing circuit 15 differs in no way from the signal processing used with optical spectral analysers as described in detail with reference to the preceding figures. To this extent the description of FIGS. 1 to 11 holds in just the same way for the application of the invention to a mass spectrometer as shown in FIG. 12.

The application of the invention to an X-ray spectrometer is illustrated in FIG. 13. An X-ray beam 39 passes from an X-ray tube 40 to the object 41 under investigation. From there the X-ray beam which has been influenced in accordance with the nature of the object is deflected through a diaphragm 42 to an analyser crystal 43 which forms the splitting means or dispersive element of the arrangement. The modulator 11 of the invention, which once again executes a periodic to and fro movement in the direction of the double arrow f, is arranged in the path of the radiation emerging from the dispersion member 43. An X-ray radiation detector 13 is arranged behind the modulator 11 and is connected to the processing circuit 15. The measurement signals I''', II''' and III''' are once again present at the output of the processing circuit.

It will be understood, when using a strip-like modulator diaphragm 11 which oscillates to and fro in accordance with FIGS. 12 and 13, that the reference modulator 14 should also be correspondingly constructed and moved to and fro. The reference signals necessary for the individual channels with to and fro movement of the modulator 11 can also be readily generated using the electronic reference circuit of FIG. 11.

In the case of an X-ray spectrometer in accordance with FIG. 13 the detector 13 can, for example take the form of a counter tube on which all the components of the radiation from the dispersion member 43 fall.

Although the above methods of evaluating the modulated signal are particularly advantageous it is also possible to select the signals using periodically tunable filters. The tunable filters are in this case synchronized with the spectral component modulators 11. In this manner the frequency of the signal of each spectral component is always the same as the filter transmission frequency of the associated channel. Furthermore it is also possible to select the repetition frequency of the spectral component modulator 11 and the tunable filters to differ from one another. In this arrangement the repetition frequency of the filter should be made much smaller than that of the modulator. Synchronization between the modulator and the filter can then be avoided. If an oscillograph or a registration apparatus is connected to the output of the filter then the physical spectrum will be reproduced by these devices with high resolution and simple means. The energy of the physical spectrum will however in this case not be ideally utilized.

FIG. 14 shows a further processing circuit 15 for the output signals coming from the detector 13 which contain the entire frequency mix. In this preferred embodiment of the invention the signals are passed to the input of a dispersive delay line 44. The speed of propagation of the signals in this delay line 44 depends on the frequency of the signals. By way of example the speed of propagation can continually fall as the frequency increases. In this case, in accordance with the invention, the modulator 11 begins its modulation cycle at the highest frequency for the spectral component 1. At a later time the same spectral component 1 is modulated at lower frequencies. The lower frequencies however propagate faster through the dispersive delay line 44. After a predetermined interval, which is dependent on the dispersive function of the delay line 44, the signals with lower frequencies catch up with the signals of higher frequencies. The total energy of the first spectral component is at this time concentrated in a small section of the dispersive delay line 44.

In accordance with the invention the length of the dispersive delay line 44 is now selected so that all the signals of one spectral component simultaneously reach the end (or a tapping point) of the dispersive delay line 44.

The output signal of the dispersive delay line 44 is now passed to hold circuits 47 via an electronic switch 46 controlled by a control generator 45. The hold circuits 47 store the signal for the duration of a modulation cycle. A synchronizing signal from the main modulator 11 is again supplied to the input 36 of the control generator 45 so that the four individual switches a, b, c and d of the electronic switch 46 always close one after the other for a short interval when the associated spectral component signals appear at the end of the dispersive delay line 44.

As, by way of example, the modulation cycle for the spectral component 2 starts with the highest modulation frequency at a somewhat later time the concentration of the total energy of the signal for the second spectral component arrives at a somewhat later time at the end of the dispersive delay line 44 so that the individual spectral component signals are timewise decoupled at the outlet of the dispersive delay line 44. This can be exploited through the sequential closing of the switches a, b, c and d to enable selection of the spectral component signals and their separate storage in the hold circuits 47.

In the embodiment of FIG. 14 it is assumed that a total of four different spectral lines are to be evaluated. The spectral component output signals I''', II''', III''' and IV''' then appear at the output of the hold circuit 47.

Instead of distributing the signals into distinct channels a viewing device, for example an oscillograph or the like can be connected to the output of the dispersive delay line 44. In this case the spectrum will be continuously imaged in real time and indeed with an optimum signal to noise ratio because the total energy of each spectral component is available at any point in time. Dispersive delay lines 44 can also be simulated by computers.

Turning now to the embodiment of FIG. 15 there is shown an alternative arrangement to FIG. 3 in which the modulator means 11, in this case also a chopper drum, is provided before the splitting means which once again takes the form of an optical prism or grating. The modulation structure in the peripheral wall of the chopper drum 11 is now located at the position occupied by the input slot 25 for the monochromator or spectrometer of FIG. 3. The modulation structure is imaged via the deflecting mirror 27, the lenses 26 and also the dispersive member 19 arranged between the lenses 26, onto a slot 49 of a slot diaphragm 48. The common detector 13 of the invention, to which the processing circuit 15 is connected, is arranged behind the slot 49. The processing circuit delivers, in analogy to the preceding embodiments, the spectral output signals I''', II''', III''' and IV'''. This figure makes it clear, that the thought underlying the invention can also be realized by arranging the modulator 11 in front of the splitting means.

The functioning of this embodiment will be better understood from the following discussion. It will be appreciated that in the arrangements of the preceding figures the splitting means has split the radiation into a spectrum of different spectral components so that distinct locations along the spectrum are associated with respective spectral components in the beam of radiation. The spatial separation of the individual spectral components then makes it possible to modulate these individual components in such a way that the modulation of any one component differs at any particular time from the modulation of the other components. This in turn makes it possible to use a common detector and to segregate, in particular by electronic means, the information signals relating to the individual spectral components. This same principle is used in the arrangement of FIG. 15 the operation of which can be understood by considering the simple case of a beam of white light radiation directed onto a prism. In this situation the beam of white light is split into various components say red, yellow and blue components, which pass through different locations on the output side of the prism. As the paths of the light beams are reversible the prism could also be used to combine red, yellow and blue light beams from different locations into a single white light beam. The red, yellow and blue components can however also be imagined as belonging to a broad beam of white light radiation. Thus, different spectral components originating from distinct locations in such a broad white light beam can be regarded as being directed through a common location by the prism.

This is the principle on which the embodiment of FIG. 15 works. In other words the modulator drum 11 of FIG. 15 modulates the different spectral components at different locations in the beam on the input side of the splitting means and the detector detects the light directed through a common location by the splitting means. The modulator means is thus able to impose a location dependent modulation on the spectral components.

It will be appreciated that the arrangement just described above tends to be wasteful of energy. The energy passing through the splitting means 19 of FIG. 15 can however be better utilized if further equivalent slots 49', 49'' etc. are provided alongside the slot 49. Further detectors 13', 13'' etc. are then arranged behind the further slots. Respective processing circuits 15', 15'' etc. are connected to the further detectors 13', 13'' etc. and the outputs of all the processing circuits are additively connected. This arrangement results in a considerable improvement in the utilisation of the available energy.

The particular advantage of the embodiment of FIG. 15 over the previously described embodiments resides in the fact that the detectors 13, 13', 13'' etc can be made considerably smaller. This not only brings economic advantages but also provides an improved noise to signal ratio. Furthermore, numerous detectors and associated processing circuits can be used to improve the utilisation of the energy of the physical spectrum. By adding the output signals of the corresponding channels the available energy can be exploited as desired. The size of the detector 13 used in the embodiment of FIG. 3 can be reduced using the arrangement shown in FIG. 16. In this arrangement the light which has passed through the monochromator 19 and the modulator 11 is deflected at a mirror 50 and send back through the modulator 11 and the monochromator 19. In this way the dispersion is reversed and the spectrum is once again drawn together to form a stripe-like light bead. Because of the modulation of the signal components the information on the position of the spectral components at the output image plane of the monochromator is maintained. The detector 13 to which the processing circuit 15 is connected is located in this arrangement in the plane of the stripe-like light bead. In order to prevent the input light beam from being obscured by the detector the mirror 50 is inclined somewhat so that the stripe-like light bead falls alongside the inlet slot 25.

The described arrangements can be modified in various ways. In particular, amplifiers and further imaging elements can be introduced. It is also possible to modulate the spectrum section by section with more than one modulator or to direct the beam passing through one modulator to several detectors. It is also possible to use reflecting modulators which effect modulation by changing the reflection factor.

The principal advantages of the apparatus of the invention reside in the fact that the modulator operates independently of the material to be analysed. It is only necessary to appropriately adjust the electronic filters. When using digital filtering it is only necessary to specify one constant in the program.

The scanning movement of the modulator takes place parallel to the spatial extent of the optical spectrum. For this reason very high modulation frequencies of up to $10^7$ Hz are possible. In this way resolutions can be achieved which are higher than the resolution of the spectrometer. Thus even spectral lines which lie very close to one another can be analysed as desired.

The modulation frequency used in the method of the invention does not have to be continuously variable. In the extreme case it is even possible to use a code modulation. In this event the term synchronous demodulation is not restricted to the selection of sinusoidal components but can instead take place in accordance with any desired function provided the corresponding reference signals are led to the synchronous demodulators. The optical spectrum can also be analysed section by section by several modulators.

If the optical beam cannot be deflected the chopper drum 11 can also be arranged horizontally with the rotational axle located beneath the second lens 26 in FIG. 3. To prevent the beam from the lens being obscured the drum 11 is provided with cut-out sections or supplemented with transparent sections at a location diametrically opposite to the modulation structure.

Other modifications will be apparent to those skilled in the art without departing from the scope of the present teaching.

1. A method of spectral analysis of a beam of radiation to determine one or more spectral components thereof, the method comprising the steps of:

(a) directing the beam of radiation to splitting means capable of splitting the radiation into a spectrum of different spectral components so that distinct locations along the spectrum are associated with respective spectral components in said beam, (b) modulating said spectrum after said splitting means by modulator means common to all spectral components which imposes a common and repetitive location and time dependent modulation function on the spectral components, whereby each spectral component is modulated by the same modulation function, but at any given time exhibits a different instantaneous modulation from any other spectral components, (c) collecting the modulated spectral components on common detection means to generate superimposed signals representative of said modulated spectral components, (d) electronically segregating the signals in dependence on the instantaneous modulations applied to the spectral components to form an individual measurement signal for each spectral component of interest.

2. A method in accordance with claim 1 and wherein said location and time dependent modulation function has a frequency which changes continuously as a function of time.

3. A method in accordance with claim 2 and wherein the location and time dependent modulation of the spectral components is produced by relative movement between said modulator means and said spectrum with said modulator means comprising a series of non-uniformly spaced modulator elements.

4. A method in accordance with claim 1 and comprising the further step of forming, in respect of each spectral component of interest a reference signal having a frequency related to the instantaneous modulation applied to that spectral component and wherein the step of electronically segregating the signals comprises the step of using this reference signal to filter out the measurement signal associated with that spectral component from said superimposed signals.

5. A method in accordance with claim 2 wherein said superimposed signals are fed to a dispersive delay line the length of which is chosen in dependence on the change of the modulation frequency with time so that all the signals representative of a single spectral component arrive simultaneously as a packet at an end of, or at a tapping point of, the dispersive delay line and wherein the times of arrival of the individual packets are determined to identify the individual spectral components.

6. A method in accordance with claim 2 and wherein said location and time dependent modulation function has a frequency which changes linearly in saw-tooth-like form.

7. A method in accordance with claim 1 and wherein said modulator means operates in transmission and the transmission of the modulator means is a rectangular or sinusoidal function of position along the modulator means.

8. A method in accordance with claim 1 and wherein said modulator means is moved relative to said spectrum at a constant relative speed.

9. A method in accordance with claim 1 and wherein said radiation lies in the optical spectrum.

10. A method in accordance with claim 1 and wherein said spectrum is one of an X-ray spectrum, γ-ray spectrum, particle ray spectrum and a mass spectrum.

11. Apparatus for the spectral analysis of a beam of radiation to determine one or more spectral components thereof, said apparatus comprising splitting means capable of splitting said beam of radiation into a spectrum of different spectral components so that distinct locations along the spectrum are associated with respective spectral components in said beam; means for modulating said spectrum after said splitting means to impose a common and repetitive location and time dependent modulation function on each of the spectral components, whereby each spectral component is modulated by the same modulation function, but at any given time exhibits a different instantaneous modulation from any other spectral component; common detector means for receiving the modulated spectral components to generate superimposed signals representative of these modulated spectral components, and electronic processing circuitry for electronically segregating said superimposed signals in dependence on the instantaneous modulations applied to the spectral components to form an individual measurement signal for the spectral component of interest.

12. Apparatus in accordance with claim 11 and wherein said modulator means takes the form of a series of non-uniformly spaced modulator elements and wherein said location and time dependent modulation function is produced by relative movement between said modulator means along said spectrum.

13. Apparatus in accordance with claim 11 and wherein there is further provided means for generating, in respect of each spectral component of interest, a modulated reference signal the modulation of which is related to the instantaneous modulation imposed on the respective spectral component and wherein said means for electronically segregating said superimposed signals comprises electronic processing circuitry adapted to use the or each said modulated reference signal to isolate the respectively associated spectral component.

14. Apparatus in accordance with claim 13 and wherein said superimposed signals from said common detector means are electrical signals and wherein said electronic processing circuitry is adapted to filter out from the superimposed signals, the measurement signals associated with the individual spectral components by means of the respectively associated reference signals the modulations of which are at any one time fixedly related to the modulations of the respectively associated individual spectral components.

15. Apparatus in accordance with claim 14 and wherein said electronic processing circuitry has respective outputs for each of the spectral components of interest.

16. Apparatus in accordance with claim 15 and wherein said electronic processing circuit comprises a filter in respect of each spectral component of interest.

17. Apparatus in accordance with claim 16 and wherein the filter function is realized by digital operations.

18. Apparatus in accordance with claim 11 and wherein said modulator means is a mechanically moved chopper.

19. Apparatus in accordance with claim 18 and wherein said chopper is formed by a chopper drum.

20. Apparatus in accordance with claim 11 and wherein said modulator is an optoacoustic modulator.

21. Apparatus in accordance with claim 19 wherein said chopper drum has an axis and is rotatable about said axis, and wherein means are provided for deflecting said beam of radiation after said splitting means through approximately 90° onto an interior surface of said chopper drum, with said axis lying parallel to said beam of radiation prior to deflection at said deflection means.

22. Apparatus in accordance with claim 19 wherein said chopper drum has an axis and is rotatable about said axis, with said axis being arranged at right angles to said beam of radiation and wherein said chopper drum has at least one transparent section in which no modulation structure is present and a diametrically opposed section in which modulation structure is present.

23. Apparatus in accordance with claim 19 and wherein an image forming focussing element is arranged after said splitting means and wherein said chopper drum has a radius which is approximately the same as the focal length of said imaging element.

24. Apparatus in accordance with claim 13 wherein the output signal of said common detector means is simultaneously applied to several synchronous demodulators and wherein each of said synchronous demodulators is supplied with a respective one of said reference signals.

25. Apparatus in accordance with claim 24 and wherein a low pass filter is connected to each synchronous demodulator.

26. Apparatus in accordance with claim 13 and wherein said electronic processing circuitry comprises one or more mixers, with band-pass filters being arranged at the outlets of the or each mixer with the or each mixer being adapted to receive a respective modulated reference signal which differs by a constant frequency from the modulation imposed on an associated one of the spectral components of interest and with the band pass filters being tuned to the difference frequencies.

27. Apparatus in accordance with claim 26 and wherein the spectrum is evaluated after the mixer by a tunable filter with the limiting frequency of the filter being much smaller than the repetition frequency of said modulation function.

28. Apparatus in accordance with claim 26, wherein a plurality of mixers are provided and several band pass filters with different transmission ranges are arranged after one of said mixers.

29. Apparatus in accordance with claim 13 and wherein a tunable band pass filter is arranged after said common detection means, with the tuning of the band pass filter taking place synchronously with a change of the modulation function.

30. Apparatus in accordance with claim 11 and wherein a dispersive delay line is arranged after the detector.

31. Apparatus in accordance with claim 30 and wherein temporally controlled gates are arranged at outlets of the dispersive delay line to selectively feed emergent signals into respective channels.

32. Apparatus in accordance with claim 13 and wherein said means for generating modulated reference signals comprises a light barrier in respect of each spectral component of interest, and second modulator means with a location and time dependent modulation function adapted to modulate light beams of said light barriers to produce said modulated reference signals.

33. Apparatus in accordance with claim 32 and wherein the modulation functions of the first said modulator means and the second said modulator means are similar to one another.

34. Apparatus in accordance with claim 33 and wherein said modulation functions are substantially the same as but time displaced relative to one another.

35. Apparatus in accordance with claim 13 and wherein said means for generating modulated reference signals comprises electronic generator means with the output signals from said generator means being synchronized with the modulations imposed on said spectral components.

36. Apparatus in accordance with claim 35 and wherein the frequency of said generator means changes linearly with time and springs back to the original value after a predetermined interval.

37. Apparatus in accordance with claim 35 wherein said generator signals from said generator means are passed to auxiliary mixers together with respectively different but constant second input frequencies and wherein the output signals of the auxiliary mixers form said modulated reference signals.

38. Apparatus in accordance with claim 11 and wherein said beam of radiation is directed back through the first said splitting means.

39. Apparatus in accordance with claim 11 and wherein the mark space ratio of said modulator means is 0.5.

40. Apparatus in accordance with claim 11 and wherein the unused spectral ranges are suppressed with mechanical range stops.

41. Apparatus in accordance with claim 11 wherein the output signal of said common detector means is simultaneously applied to a plurality of mixers, wherein band-pass filters are arranged at the outputs of the mixers, wherein second input signals are applied to each of the mixers, with each of the second input signals being selected so that the sum of the frequencies of the two input signals is a constant for the spectral component which is to be selected, and wherein the associated band pass filer is tuned to the associated summed frequency.

42. Apparatus in accordance with claim 15 wherein said electronic processing circuit comprises a synchronous demodulator in respect of each spectral component of interest.

43. Apparatus in accordance with claim 20 wherein said optoacoustic modulator is a travelling wave modulator.

44. A method of spectral analysis of a beam of radiation to determine one or more spectral components thereof, the method comprising the steps of:
 (a) directing the beam of radiation to splitting means capable of splitting the radiation into a spectrum of different spectral components so that different spectral components originating from distinct locations in the beam are directed through a common location by said splitting means,
 (b) modulating said radiation before said splitting means by modulator means common to all spectral components which imposes a common and repetitive location and time dependent modulation function on the spectral components, whereby spectral components originating from distinct locations in the beam are modulated by the same modulation function but at any given time exhibit different instantaneous modulations from each other,
 (c) collecting the modulated spectral components on common detection means arranged at said common location to generate superimposed signals representative of these modulated spectral components,
 (d) electronically segregating the signals in dependence on the instantaneous modulations applied to the spectral components to form an individual measurement signal for each spectral component of interest.

45. Apparatus for the spectral analysis of a beam of radiation to determine one or more spectral components thereof, said apparatus comprising splitting means capable of splitting said beam of radiation into a spectrum of different spectral components so that different spectral components originating from distinct locations in said beam are directed through a common location by said splitting means; means for modulating said radiation before said splitting means to impose a common and repetitive location and time dependent modulation function on each of the spectral components, whereby spectral components originating from distinct locations in the beam are modulated by the same modulation function but at any given time exhibit different instantaneous modulations from each other, common detector means at said common location for receiving the individually modulated spectral components to generate superimposed signals representative of these modulated spectral components, and electronic processing circuitry for electronically segregating said superimposed signals in dependence on the instantaneous modulations applied to the spectral components to form an individual measurement signal for each spectral component of interest.

* * * * *